United States Patent
Liddell

(10) Patent No.: US 11,893,343 B2
(45) Date of Patent: Feb. 6, 2024

(54) MULTIPLE DATAPOINT FORMATS IN SPREADSHEETS

(71) Applicant: Microsoft Technology Licensing, LLC, Redmond, WA (US)

(72) Inventor: Derek Liddell, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 17 days.

(21) Appl. No.: 17/521,568

(22) Filed: Nov. 8, 2021

(65) Prior Publication Data

US 2023/0146609 A1    May 11, 2023

(51) Int. Cl.
*G06F 40/18*    (2020.01)
*H04L 67/04*    (2022.01)

(52) U.S. Cl.
CPC ............. *G06F 40/18* (2020.01); *H04L 67/04* (2013.01)

(58) Field of Classification Search
CPC ................................. G06F 40/18; H04L 67/04
See application file for complete search history.

(56) References Cited

U.S. PATENT DOCUMENTS

| 7,783,966 B2 * | 8/2010 | Mitsui ..................... G06F 40/18 715/219 |
| 2014/0026041 A1 | 1/2014 | Bhargav et al. |
| 2017/0124050 A1 * | 5/2017 | Campbell ........... G06F 3/04847 |
| 2021/0406458 A1 * | 12/2021 | Dvorak ................. G06F 3/0489 |

OTHER PUBLICATIONS

"PhotoSpread Quick User's Manual", Retrieved from: http://web.archive.org/web/20110708161116/http://infolab.stanford.edu/-paepcke/shared-documents/PhotoSpread/photospreadManual010309.pdf, Jul. 8, 2011, pp. 1-17.
"International Search Report and Written Opinion Issued in PCT Application No. PCT/US22/040383", dated Nov. 18, 2022, 13 Pages.

* cited by examiner

*Primary Examiner* — Jennifer N Welch
*Assistant Examiner* — Amy P Hoang

(57) ABSTRACT

Systems, methods, and software are disclosed herein that allow multiple values to be stored and referenced individually in a spreadsheet or table cell. In an implementation, an application identifies a format of a cell in a spreadsheet with a format having multiple data points. The application receives multiple values corresponding to the multiple data points and stores each value of the multiple values in the cell as a separately referenceable value with respect to each other value of the multiple values. In some implementations, formulas in other cells or sub-routines can reference an individual one of the values in the cell.

20 Claims, 10 Drawing Sheets

IDENTIFY A MULTI-POINT FORMAT OF A CELL IN A SPREADSHEET OR TABLE  201

RECEIVE VALUES CORRESPONDING TO THE DATA POINTS OF THE FORMAT  203

STORE EACH VALUE IN THE CELL AS  205
A SEPARATELY REFERENCEABLE VALUE

MULTIPLE DATAPOINT FORMATS IN SPREADSHEETS

TECHNICAL FIELD

Aspects of the disclosure are related to the field of computer software applications and, in particular, to spreadsheet applications and associated technology.

BACKGROUND

Spreadsheet applications are powerful tools for interacting with data of all types. Familiar features of spreadsheet applications include the ability to sort and tabulate data, to generate charts and pivot tables for analyzing data, and to create formulas that automatically calculate values based on the contents of other cells.

When users desire to gather data from the field today, they may access a spreadsheet on their phone or mobile device and enter data into the cells of the spreadsheet. However, such user experiences are hindered by the relatively small screen size of most mobile devices—especially when compared to the large screens encountered in desktop environments. Some spreadsheets will have dozens or even hundreds of columns, which can be difficult to navigate in environments with limited display space.

OVERVIEW

Technology is disclosed herein that improves the user experience with respect to spreadsheets, tables, and other such productivity tools by allowing multiple values to be stored in a single cell. Such advances improve the user experience by making it easier to enter values in situations where screen space is at a premium.

In an implementation, an application identifies a format of a cell in a spreadsheet with a format having multiple data points. The application receives multiple values corresponding to the multiple data points and stores each value of the multiple values in the cell as a separately referenceable value with respect to each other value of the multiple values. In some implementations, formulas in other cells or subroutines can reference an individual one of the values in the cell as an operand in a formula without having to split-out the values from the cell into which they were entered and stored. In other implementations, the values may be entered into the cell through a user interface that includes multiple input elements corresponding to the multiple data points defined by the format.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Various implementations are disclosed herein that allow a spreadsheet owner to define a format schema for a column or cell. That schema can store multiple data points which can be entered via a user interface constructed based on the schema. Such advances support data entry in a much more streamlined manner that fits in the boundaries of mobile devices with limited display space. In addition, a user need not traverse many columns to enter data. In some implementations, each datapoint can be addressed with a "dot" operator or other delimiting indicator such that a function or routine can address the individual values. In some implementations, the format may comprise a custom schema defined in accordance with a standard notation such as JavaScript Object Notation (JSON).

Using JSON to provide a custom format for cells, a user may define the exact schema they want for the data in a given column. Based on JSON schema they can define all the data points and their types. They can also specify which data is required. Since JSON uses simple strings, the data can be serialized and stored very easily by most spreadsheet applications.

Moreover, since a column may be bound to a schema, the supporting application can automatically generate a user interface that allows a user to enter the data points for a cell from a mobile device. Once the cell is activated the user experiences each field in a form-like experience where they may enter the required data for a cell one field at a time. The entered values are then saved in the cell in accordance with its JSON-defined schema.

Figure 1:
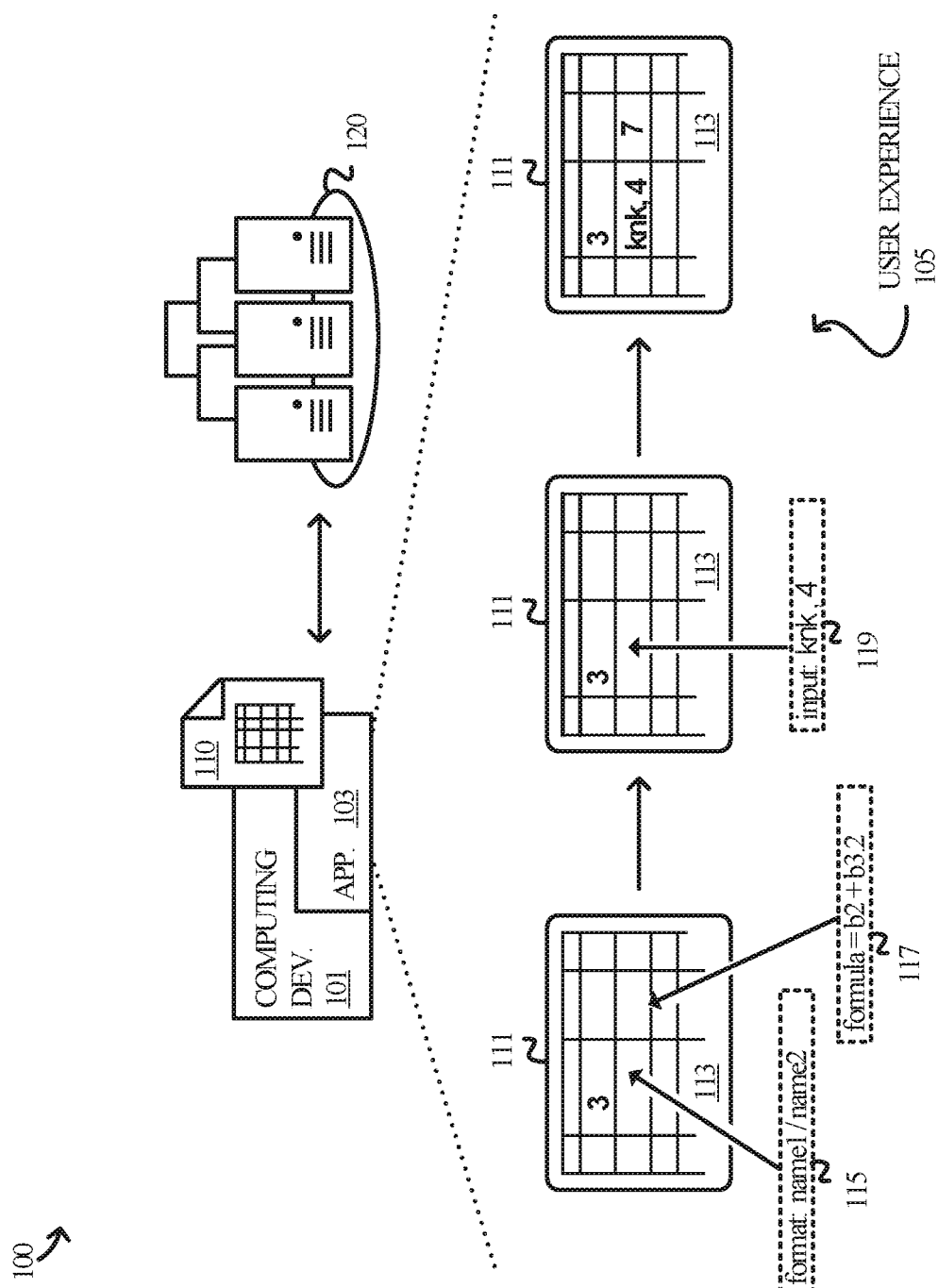
FIG. 1 illustrates an operational environment in an implementation.
Figure 7:
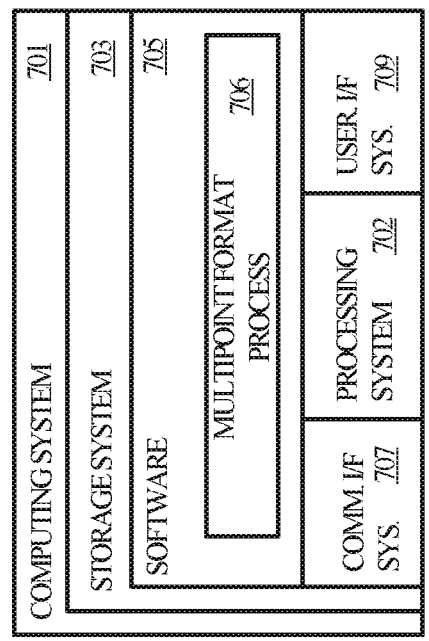
FIG. 7 illustrates a computing system suitable for implementing the various operational environments, architectures, processes, scenarios, and sequences discussed below with respect to the other Figures.

FIG. 1 illustrates an operational environment 100 in an implementation. Operational environment 100 includes computing device 101 and online service 120. Computing device 101 includes one or more software applications, of which application 103 is representative, capable of providing a user experience 105 with respect to a spreadsheet workbook (workbook 110). The user experience 105 produced by computing device 101 includes a user interface 111 through which a user may interact with and otherwise experience a spreadsheet 113 from workbook 110. Examples of computing device 101 include personal computers, tablet computers, mobile phones, and any other suitable devices, of which computing device 701 in FIG. 7 is broadly representative.

Application 103 is representative of any software application in which a user can open and edit a spreadsheet or table, which may be contained in a spreadsheet workbook, a word processing document, a digital notebook, an email, or any other type of file. Examples of application 103 include—but are not limited to—spreadsheet applications, word processing applications, digital notebook applications, and email applications. Application 103 may be a natively installed and executed application, a browser-based application, a mobile application, or any other application suitable for experiencing spreadsheets, tables, and the like. Application 103 may execute in a stand-alone manner (as in the case of a natively installed application) or within the context of another application (as in the case of a browser-based application), or in some other manner entirely.

Online service 120, which is optional, provides one or more computing services to end points such as computing device 101. For example, online service 120 may host all or portions of workbook 110, and all or portions of a spreadsheet application. Accordingly, it may be appreciated that some of the features and functionality attributed to application 103 on computing device 101 may be performed by online service 120 in some implementations. Online service 120 may provide a variety of other services including file storage, co-authoring and collaboration support, and the like. In some examples, online service 120 may provide a suite of applications and services with respect to a variety of computing workloads such as office productivity tasks, email, chat, voice and video, and so on. Online service 120 employs one or more server computers co-located or distributed across one or more data centers connected to computing device 101. Examples of such servers include web servers, application servers, virtual or physical (bare metal) servers, or any combination or variation thereof, of which computing device 701 in FIG. 7 is broadly representative. Computing device 101 may communicate with online service 120 via one or more internets and intranets, the Internet, wired and wireless networks, local area networks (LANs), wide area networks (WANs), and any other type of network or combination thereof.

Figure 2:
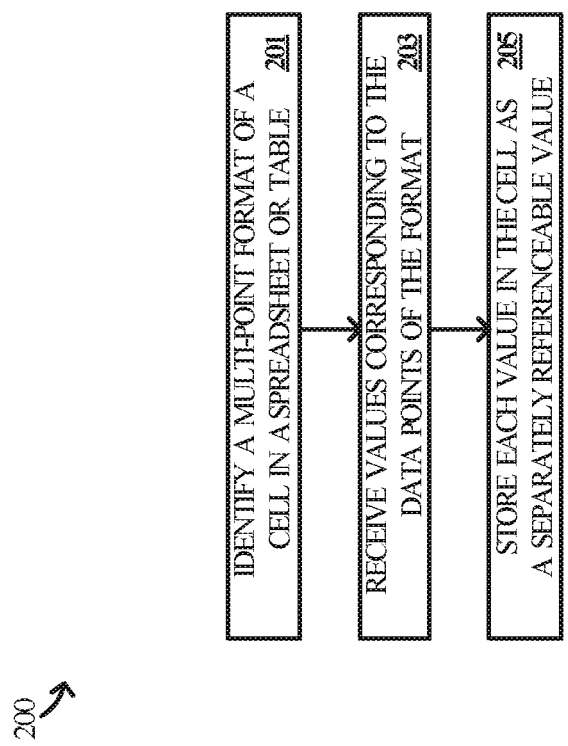
FIG. 2 illustrates a multipoint format process in an implementation.

FIG. 2 illustrates a multipoint format process in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

In operation, the computing device identifies a multipoint format of a cell in a spreadsheet or table (step 201). This may occur when—for example—a user clicks on or otherwise selects the cell, or when a macro or sub-routine selects the cell. The multipoint format specifies a schema having multiple data points, meaning that multiple data values can be entered into the cell. The schema defines how the values will be represented not only for display purposes, but also for referencing purposes. That is, the schema provides a syntax for parsing a string stored the cell into separate data values that can be displayed as such, as well as referenced by formulas and sub-routines. As such, the schema also provides a map for entering multiple values into the cell as a string with the proper syntax to allow the individual values to be separately referenced by formulas and sub-routines.

Next, the computing device receives multiple values corresponding to the multiple data points defined by the scheme (step 203). This may occur when—for example—a user supplies values as input to a user interface element (e.g., entering values into a pop-up box). Other examples include values output by one or more formulas in one or more other cells, values output by one or more sub-routines, values imported via a data pipeline from an external source, or by way of any other suitable input.

The computing device then stores each value of the multiple values in the cell as a separately referenceable value with respect to each other value of the multiple values (step 205). In some cases, the values may be provided in a string that is already formatted in accordance with the multipoint format, in which case the string is merely written to the cell. In other cases, the values may need to be concatenated with each other and possibly with other delimiting characters in order to comply with the format, after which the properly formatted string can be written to the cell.

It may be appreciated that, in some instances, the multipoint format may specify a sub-format for each datapoint. For example, a multipoint format that specifies two or more datapoints may also specify a currency format for each datapoint. Thus, when multiple values are written to the cell, each value may be represented as a dollar value (or any other currency). In another example, the multiple datapoints could be individually formatted as dates, in which case each of the multiple values would be represented as a date.

In still other examples, multiple sub-formats may be supported simultaneously within a single multipoint format. For instance, one datapoint in a multipoint format may have a currency sub-format, while another datapoint in the multipoint format may be a date format. Any number of sub-formats may be supported including all of the number formats presently supported in a variety of spreadsheet applications, examples of which include numbers, currency, accounting formats, dates, times percentages, fractions, scientific notation formats, text formats, special formats, and custom formats.

Referring back to FIG. 1, operational environment 100 includes a brief example of process 200 as employed by application 103 on computing device 101. In operation, application 103 opens workbook 110 and displays spreadsheet 113 in user interface 111. Spreadsheet 113 includes various rows and columns, the intersections of which form a grid of individual cells of the spreadsheet. It is assumed for exemplary purposes that some of the cells are blank, while others contain values, such as cell B2, which holds the number value "3."

It is further assumed for exemplary purposes that a user operating computing device 101 desires to format cell B3 in accordance with multipoint format 115. Multipoint format 115 defines the cell as accepting of multiple datapoints. The format includes a schema that provides the name and order of each of the multiple points (name1 and name2, in the same order). It is further assumed that the user desires another cell to evaluate a formula 117 that references one of the datapoints defined by multipoint format 115. In this case, the formula in cell C3 adds the single value in cell B2 to a second value in cell B3. The second value is referenced by the "dot" operator after the cell reference in formula 117 (B2.2, with the second "2" referring to the second value in cell B2), although it could be referenced in other ways. For example, formula 117 could reference the second value by its name, as in: "B3.name2." It is also assumed that applications 103 commits both the multipoint format 115 and formula 117 to spreadsheet 113 so that they are subject to subsequent calculations in the sheet.

The example proceeds next to an input 119 supplied by the user, by another formula or routine in the workbook, or some other source. Here, input 119 includes two values corresponding to the two datapoints defined by multipoint format 115. The first value is a text string "knk," while the second value is the number "4." Application 103 receives the input 119 and enters it into cell B3. Then, when a calculation is performed that evaluates formula 117, the contents of cell B3 are parsed to obtain the second value, which is added to the value in cell B2 to produce a result ("7"), which is represented in cell C3.

FIG. 3 illustrates an operational scenario 300A in another implementation of the disclosed technology. Operational scenario 300A illustrates a brief use case where cells in a table displayed by an application are formatted to accept multiple datapoints. Then, when a user proceeds to enter values into one of the cells, the application surfaces a user interface configured to accept multiple values corresponding to each of the datapoints. The multiple values are then persisted to the cell in accordance with the format schema.

In particular, operational scenario 300A involves a computing device 301 that executes an application (not shown) capable of rendering a user interface 303. The user interface 303 includes a canvas on which a spreadsheet 305 is displayed. The application may be a spreadsheet application or any other type of application or component capable of supporting a table, spreadsheet, or the like. Examples of computing device 301 include—but are not limited to—mobile phones, tablets, laptops, desktops, or any other suitable computing device.

Spreadsheet 305 includes various cells defined by rows (1-6) and columns (A-E). In this example, the spreadsheet includes a table for entering golf scores for rounds played on various days. The rounds include holes 1-18, only the first four of which fit within the screen size of computing device 301. The days include Monday-Friday.

Each cell of the table has a multiformat 307 that defines a schema for values entered into the cells. The schema defines the format as having three distinct datapoints: strokes, putts, and distance. That is, a user can enter three values into each individual cell that correspond to the number of strokes for a given hole on a given day, the number of putts for the same hole, and the distance of the hole.

When the user touches, clicks on, or otherwise selects one of the cells in the table, the application displays another user interface 310. User interface 310 may be pop-up box displayed in an overlaid manner with respect to user interface 303. In other examples, user interface 310 replaces, slides out from, or is otherwise displayed in a "flat" manner with respect to user interface 303. User interface 310 is an input module capable of receiving input from the operating user and includes various input elements for receiving the values. The input elements correspond in quantity to the quantity of datapoints defined in multipoint format 307. Moreover, the input elements draw their names from the names supplied in multipoint format 307. For example: input element 311 is named "strokes" and includes a box for entering a number of strokes for a hole; input element 313 is named "putts" and includes a box for entering a number of putts for the same hole; and input element 315 is named "distance" and includes a box for entering a distance metric for the length of the hole.

It is assumed here for exemplary purposes that the user enters the values 7, 4, and 400 into input elements 311, 313, and 315 respectively. Accordingly, the application stores all three values into the active cell C5 in accordance with multipoint format 307. This may include, for example, concatenating the values and adding syntactical characters to delimit the values from each other in the cell. Thus, once the values are committed to cell C5, the cell holds the full string "7, 4, 400" such that the individual values can be referenced by other formulas or routines.

FIG. 3 illustrates an alternative to operational scenario 300B, represented by operational scenario 300B. It may be appreciated that the depicted scenario could be implemented on its own or in combination with other scenarios. In FIG. 3, the schema of multipoint format 307 defines only three datapoints instead of two: strokes and putts, but not distance. As such, when the user touches, clicks on, or otherwise selects one of the cells in the table, user interface 310 is displayed but with only two input elements for receiving values. For instance, input element 311 receives stroke values, while input element 313 receives putt values.

It is assumed here for exemplary purposes that the user enters the values 7 and 4 into input elements 311 and 313, causing the two values to be persisted to active cell C5 in accordance with multipoint format 307. This may include, for example, concatenating the values and adding syntactical characters to delimit the values from each other in the cell. Thus, once the values are committed to cell C5, the cell holds the full string "7, 4" such that the individual values can be referenced by other formulas or routines. (Note also how cell E2 holds only two values in this scenario, relative to its three values in operational scenario 300A.) As mentioned, the configuration of user interface 310 is driven automatically by the schema of the format of the active cell. Were the active cell to have a multipoint format with six different datapoints, user interface 310 would have six different input elements, and so on.

Figure 3A:
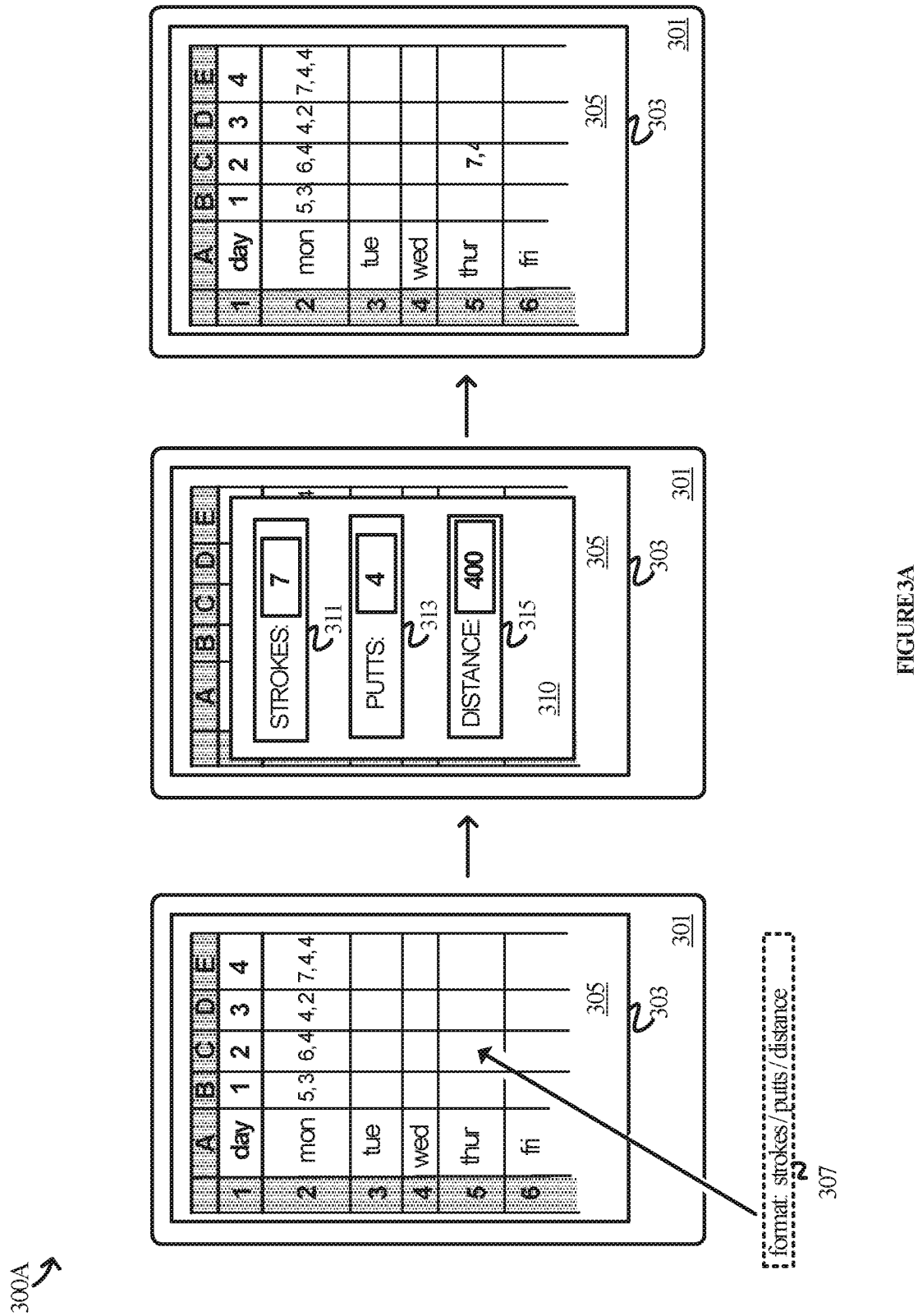
FIGS. 3A-3C illustrate an operational scenario in an implementation.
Figure 3B:
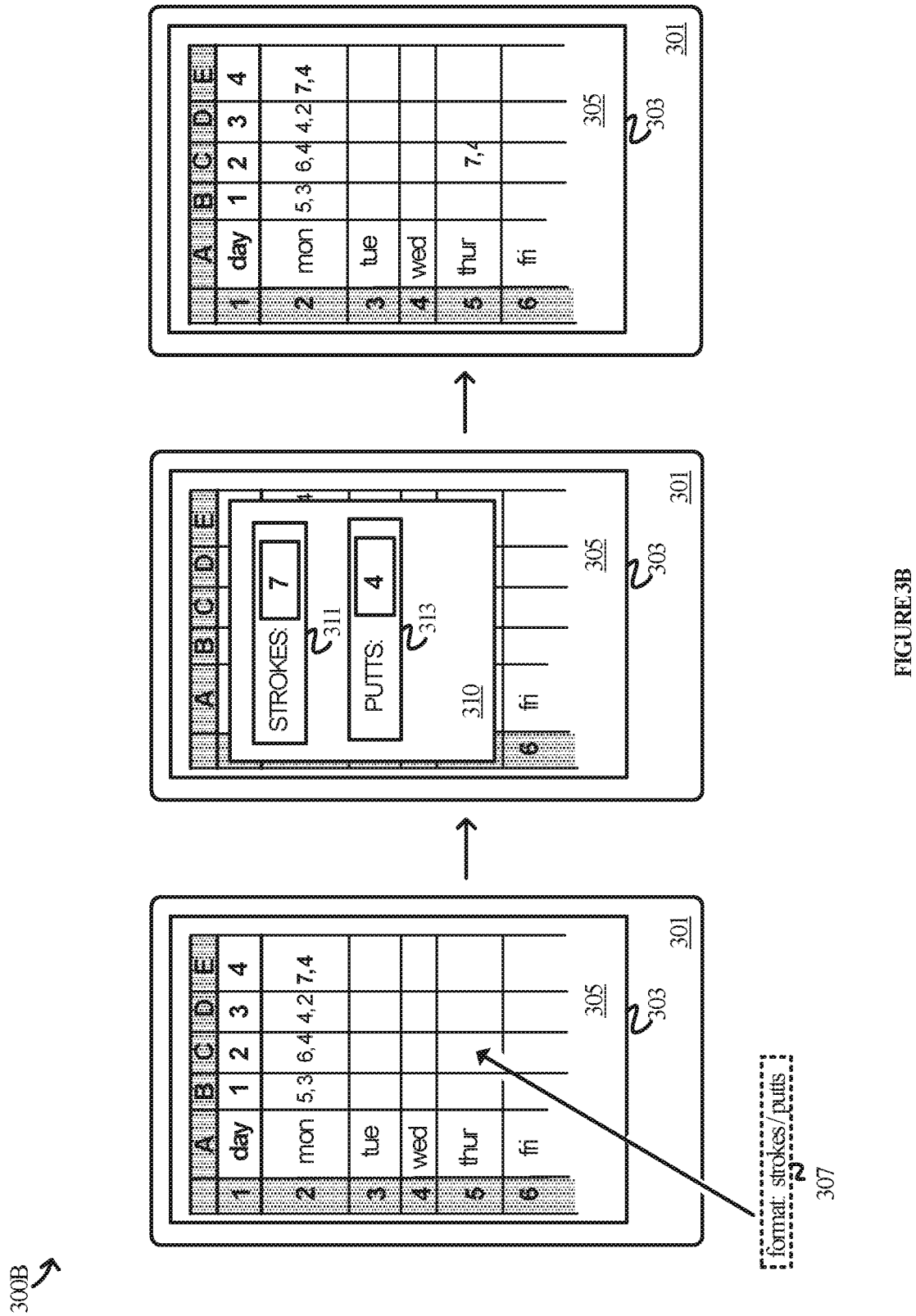
Figure 3C:
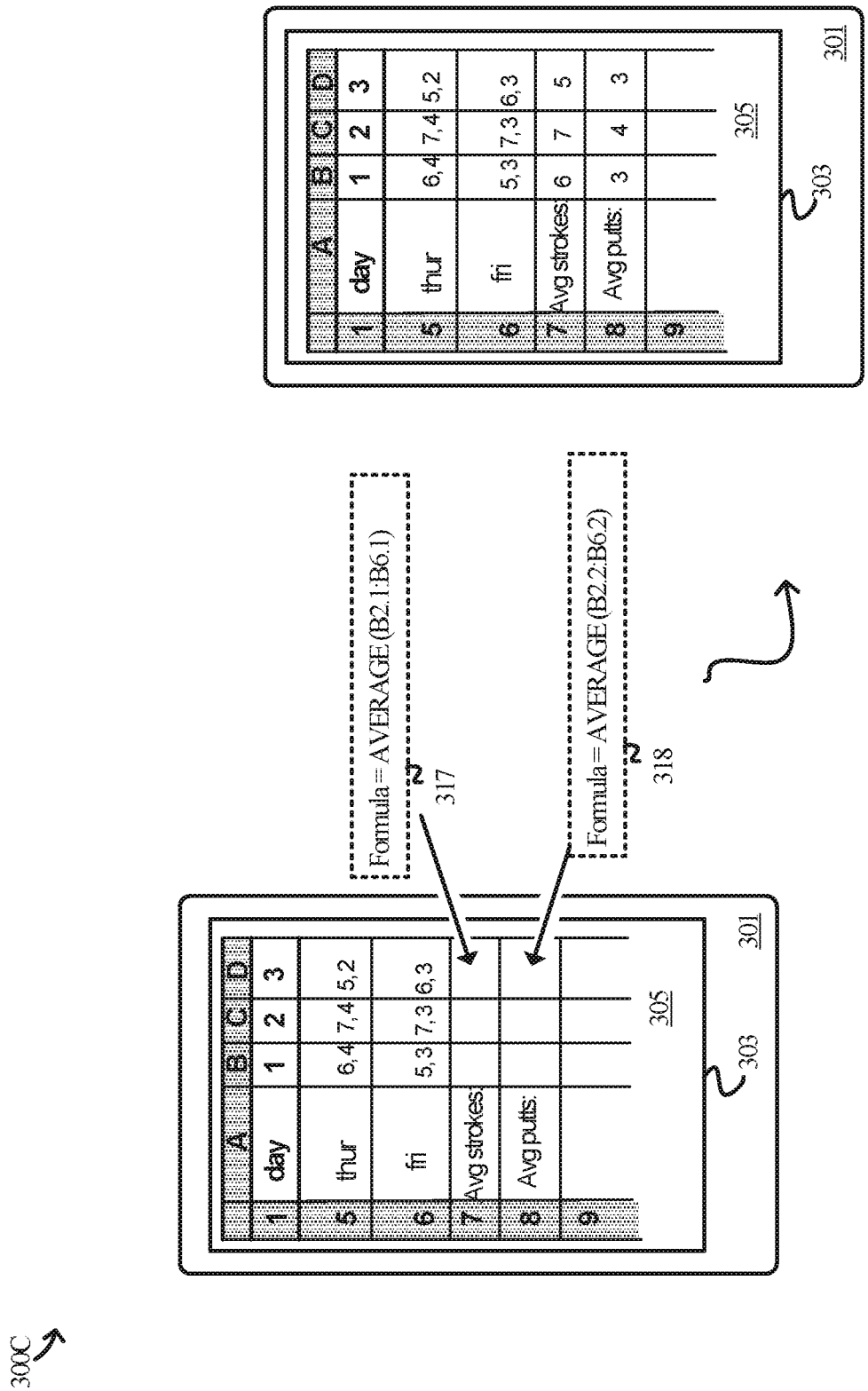

FIG. 3C illustrates operational scenario 300C, which be implemented on its own or in combination with either operational scenario in FIGS. 3A and 3B. In FIG. 3C, the user has determined to enter several formulas lower in spreadsheet 305. In particular, the user has determined to enter a formula 317 in cell D7 to calculate an average of the number of strokes for each hold across all the days in the table. To accomplish his, formula 317 includes a reference to the first value of the multiple datapoints in the range of cells B2:B6. The reference is this example is a "dot" operator after each cell name, followed by the position of the target value in the format schema of the cells. Alternatively, a name of the target value could be used. The user has also determined to enter a formula 318 to calculate the average number of putts for each hole over the days in the table. Formula 318 also includes a "dot" operator to express the reference to the second value in each cell that will be input to the average function. When the spreadsheet 305 is calculated, the single values produced by the AVERAGE functions are displayed in the corresponding cells of row 7 and row 8.

Figure 4:
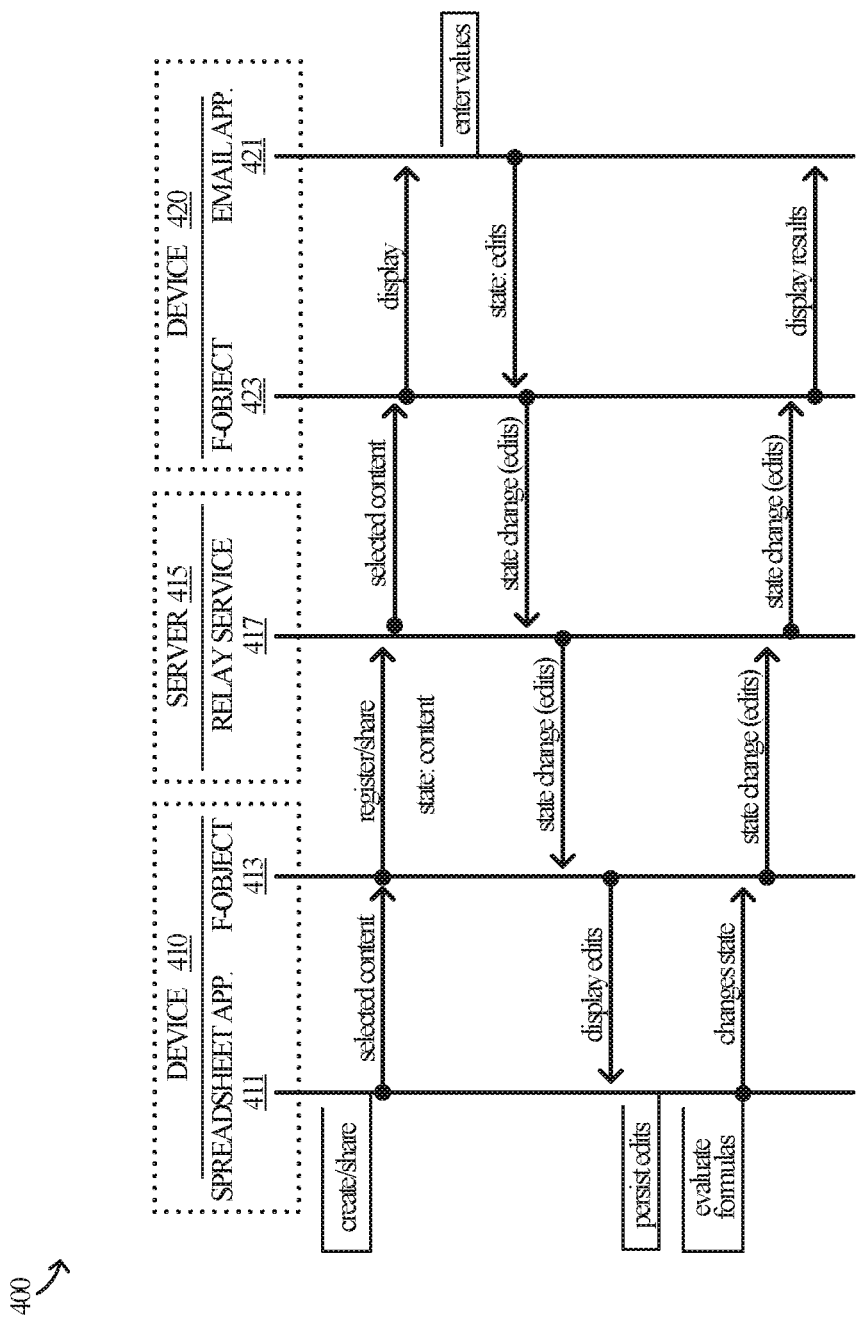
FIG. 4 illustrates another operational environment and a related operational sequence in an implementation.

FIG. 4 illustrates operational environment 400 in an alternative implementation. Operational environment 400 includes device 410, server 415, and device 420. Device 410 includes spreadsheet application 411 and a fluid object 413. Device 420 includes an email application 421 and a fluid object 423. Service 415 hosts a relay service 417 that maintains state between fluid object 413 and 423.

Fluid objects 413 and 423 are both representative of instances of a fluid object associated with content produced by spreadsheet application 411. The fluid objects each include at least two components: state information and application logic. The state information represents the state of content associated with the fluid objects, while the application logic includes instructions or meta data for interacting with the content.

In a brief example, a user operating spreadsheet application 411 may select a table from a spreadsheet to share as a fluid object. The cells of the table can be copied, linked, or otherwise published to fluid object 413, which registers with relay service 417. Registering with relay service 417 includes identifying the source of the content (the spreadsheet hosted by spreadsheet application 411) and identifying one or more other users with whom to share the fluid object. In this case, the fluid object is shared with a user of email application 421. Email application 421 includes capabilities for loading fluid object 423 and rendering both the shared content and features and functionality for interacting with the content per its application logic.

For example, the user of email application 421 can enter values into the table, delete values, or otherwise edit the table shared via fluid object 423. As edits occur, fluid object 423 updates relay service 417 with state changes caused by the edits. Relay service 417 communicates the changes to fluid object 413 so that the same changes can be displayed and persisted locally by spreadsheet application 411.

The same operations would occur—but in reverse—were the user of spreadsheet application 411 to make edits. Fluid object 413 would detect the changes and update relay service 417 with the state changes. Note however that the state changes reported by fluid object 413 would pertain only to the sub-section of the spreadsheet comprising the table that was shared. Changes to other spreadsheets in the same workbook, or even changes to other cells in the same spreadsheet would not be reported by fluid object 413. Rather, only changes to the cells within the selected table would be provided to relay service 417.

A calculation would eventually be run by spreadsheet application 411 against the cells of the spreadsheet, presumably causing a state change to the selected table. The state changes would be picked up by fluid object 413 and communicated through relay service 417 to fluid object 423. In this manner, changes caused by recalculations performed by spreadsheet application 411 would be reflected in the version of the table rendered by email application 421, thereby allowing the other user to stay abreast of such changes.

In a simple use-case, a first user may create several golf tables in a single spreadsheet for tracking multiple golf teams. The user may desire to share each individual golf table with different people or different groups of people. For example, one table may relate to one golf team, while another table may relate to another golf team. The user can share each individual table as a unique fluid object with the specific people desired for that table. Changes made to the table by either the creator or the recipients of the tables will be synchronized between each other through the relay service, without the creator having to share the entire spreadsheet with all of the users.

Figure 5A:
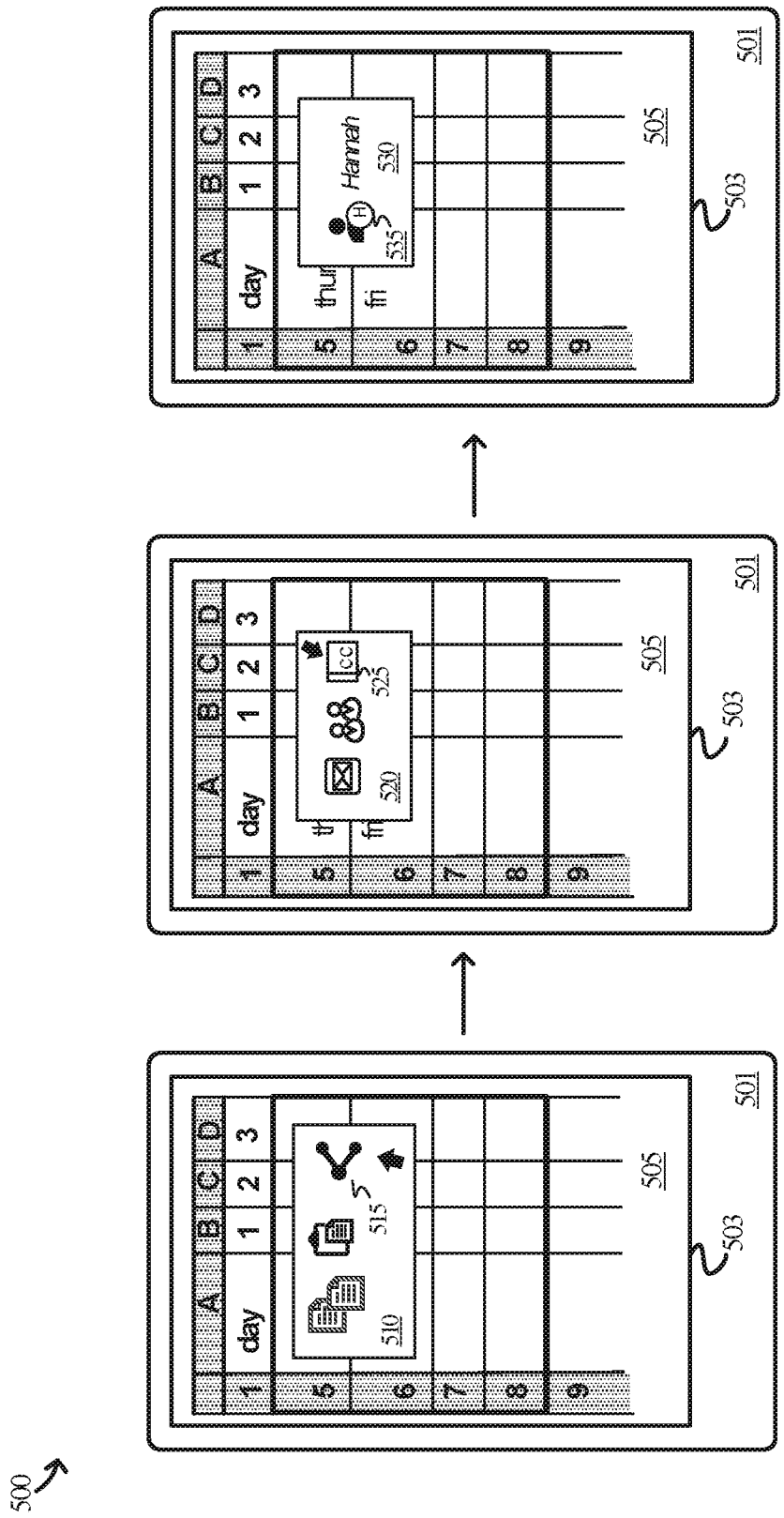
FIGS. 5A-5B illustrate another operational scenario in an implementation.
Figure 5B:
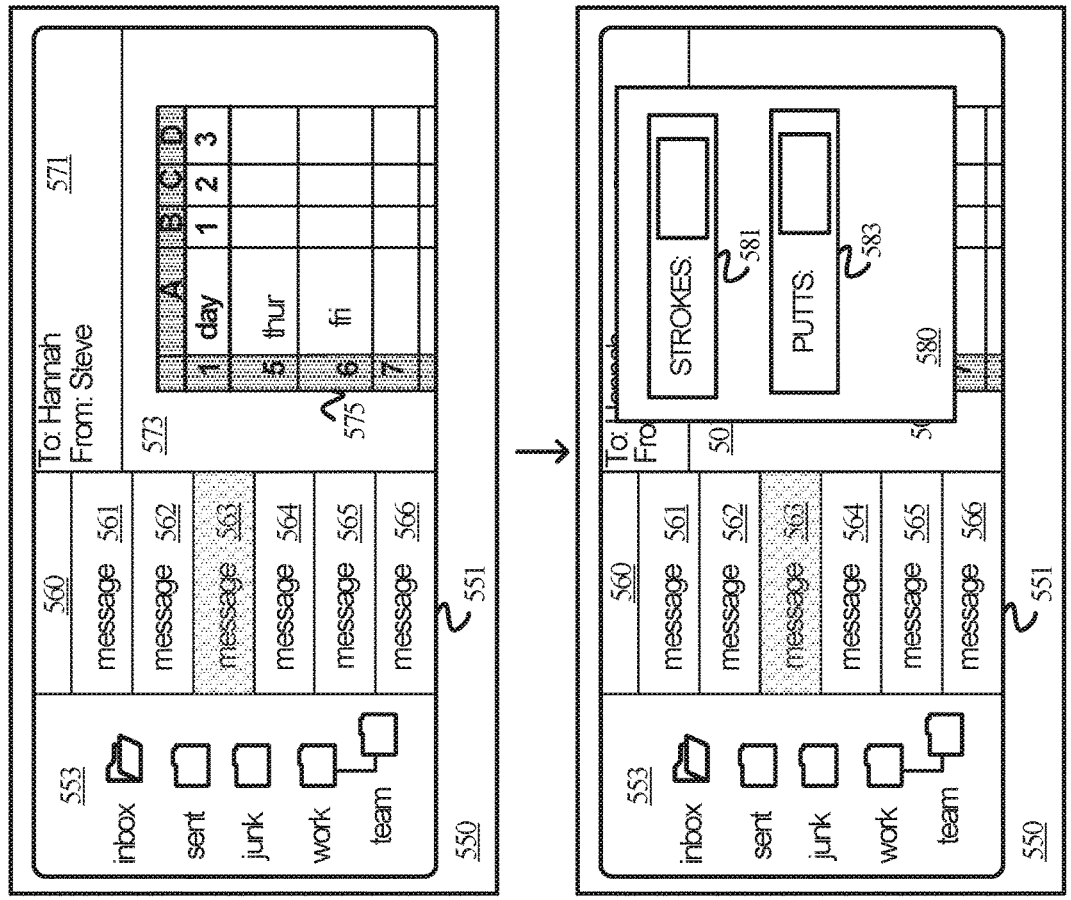

In addition, the cells of the tables being shared may be formatted in accordance with a multipoint schema as discussed above with respect to the preceding examples. Thus, the creator can share one table with a particular golf team, allowing the members of the team to enter their scores as multiple values in a single cell of the table. FIGS. 5A-5B illustrate one such exemplary implementation to better illustrate how the architecture of operational environment 400 may combine with the multipoint format concepts disclosed herein.

In FIG. 5A, operational scenario 500 includes a computing device 501 on which a spreadsheet application runs. The spreadsheet application renders a user interface 503 to a spreadsheet 505 on the display of computing device 501. The spreadsheet 505 includes groups of cells arranged in a grid defined by rows and columns. In this example, the spreadsheet is a simple table defined by golfing holes (columns) and days of the week (rows).

In this example, the user has determined to share some of the cells as a fluid object. First, the user selects a group of cells for at least two days of the week, causing the application to surface a menu 510 with various options. The options include a copy option, a paste option, and a share option 515. It is assumed for exemplary purposes that the user selects the share option 515.

In response to the selection of the share option 515, the application renders another menu with different sharing options, including an option to share the selected area by email, an option to share by instant message, and an option 525 to share via a fluid object. The user selections option 525 which causes the application to surface menu 530. Menu 530 allows the user to specify a specific person or group of people with whom to share the fluid object. In this example, the user determines to share the table with user 535 (Hannah).

In FIG. 5B, operational scenario 500 includes a computing device 550 used by the recipient (Hannah) of the shared content. Computing device 550 hosts an email application that, when executed, provides a user interface 551 to the application. User interface 551 includes a folder panel 553 for navigating to various email folders such as an inbox, sent messages, and the like. User interface 551 also includes a list 560 of messages from whichever folder is active. In this example, the inbox is active and list 560 includes messages 561-566 from the inbox.

User interface 551 also includes a viewing pane 573 for viewing the contents of an email. Here, viewing pane 573 includes some of the contents of message 563. The contents include a header 571 indicating the sender and recipient of the message, as well as a rendering 575 of the table shared via the fluid object. The rendering 575 of the table is produced by the email application or other code running within the context of the email application, such as logic provided by the fluid object or obtained at the direction of the fluid object. The code allows the user to interact with the table itself from within the context of the email application.

For example, the user proceeds in this example to touch, click on, or otherwise select one of the cells of the table. As the active cells has a multipoint format, user interface 580 is rendered for inputting multiple values into the cell. User interface 580 may be produced by the email application itself or by the other code provided by or obtained by the fluid object. User interface 580 includes input elements 581 and 583 corresponding to the multiple datapoints in the format schema of the active cell. The user can enter individual values into each input element, which causes a state change with respect to the rendering 575 of the table. The fluid object that produces the table detects the state change and updates the relay service with the state change. The relay service then provides the state change to the source of the fluid object so that the values entered by the user can be persisted to the source. In this manner, the creator of the table is able to obtain data entries from one or more other users without the users having to navigate multiple columns in order to enter multiple values. Moreover, the other users need not even have access to a spreadsheet application capable of opening the table. Rather, the table can be provided via a fluid object which can be rendered and experienced by the other users in any other type of application such as an email application, chat application, or the like.

Figure 6:
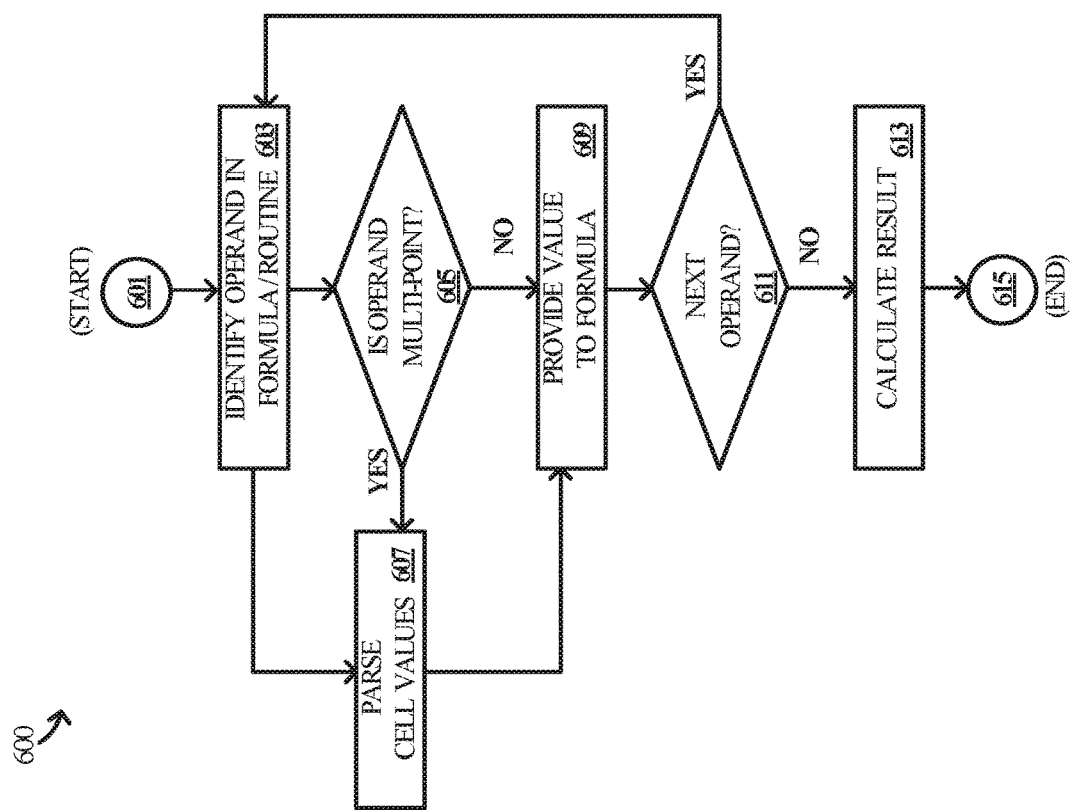
FIG. 6 illustrates another multipoint format process in an implementation.

FIG. 6 illustrates a multipoint format process in another implementation, herein referred to as process 600. Process 600 may be implemented in program instructions in the context of any of the software applications, modules, components, or other such elements of one or more computing devices. The program instructions direct the computing device(s) to operate as follows, referred to in the singular for the sake of clarity.

Process 600 begins at step 601 when a formula or routine is invoked. The formula may be invoked when a calculation cycle is performed by a spreadsheet application, when a macro is run, or at other times or driven by other factors. Process 600 examines the formula or routine to identify an operand (step 603). Next, process 600 determines whether the operand represents a multipoint operand (step 605). That is, process 600 determines whether the operand has a syntax indicative of a reference to a datapoint that is one of multiple datapoints in a cell. For example, process 600 analyzes an operand to determine if it includes a "dot" operator in conjunction with a cell reference.

If the operand does not represent a multipoint operand, process 600 reads the value from the cell and provides the value to an appropriate location to be evaluated in the context of the formula (Step 609). However, if the operand does represent a multipoint operand, process 600 proceeds to parse the values in the target cell to obtain the correct value corresponding to the operand (step 607). For example, if the operand refers to the second of three datapoints in the cell, process 600 reads the entire string into memory and parses the string per the format schema for the cell in order to identify the second value in the cell. Once process 600 has obtained the value, it loads the value 609 into memory for access when evaluating the formula (step 609).

Process 600 then determines whether one or more operands remain to be fetched and loaded into the formula (step 611). If so, process 600 returns to step 603). If not, then process 600 proceeds to calculate the result of the formula (step 613). The result of calculating the formula may be written to a cell, returned to the same sub-routine, passed to another cell or routine, or the like, at which point process 600 ends (step 615).

As mentioned above, a schema may be defined in accordance JSON. In such implementations, the JSON schema may be imported to a workbook using an import tool within a spreadsheet application. The schema can be edited by a user in an editor tool external to the spreadsheet application. In other examples, the schema may be editable from within the spreadsheet application. In fact, some implementations may support the creation and direct editing of a custom JSON schema from within the spreadsheet application.

Multiple different schemas may co-exist within a single spreadsheet or workbook. One or more of the multiple schemas may be provided as part of a default schema library. Alternatively (or in addition), one or more of the schemas may be imported to the spreadsheet as a set of schemas bundled together and offered by a third party.

A user assigns a given schema to a cell, row, or column so that all of the affected cells are bound to the chosen schema. When the cell is accessed by the user or by other aspects of the application, its schema is discovered and loaded by the application to drive the generation of the user interface for entering its values. The user interface component is built from the schema and may run data validation on values that are entered through its sub-components.

Once the data is stored, it can be accessed by cells and/or columns that use formulas. For example, a formula "NumberOfStrokesThatWereNotPutts=($B$2)·Strokes–($B$2)·Putts)" includes a parenthetical operator ($) that allows users to access individual elements of a multi-datapoint cell.

FIG. 7 illustrates computing device 701 that is representative of any system or collection of systems in which the various processes, programs, services, and scenarios disclosed herein may be implemented. Examples of computing device 701 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements multipoint format process 706, which is (are) representative of the multipoint format processes discussed with respect to the preceding Figures, such as process 200 and process 600. When executed by processing system 702, software 705 directs processing system 702 to operate as described herein for at least the various processes, operational scenarios, and sequences discussed in the foregoing implementations. Computing device 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including multipoint format process 706) may be implemented in program instructions and among other functions may, when executed by processing system 702, direct processing system 702 to operate as described with respect to the various operational scenarios, sequences, and processes illustrated herein. For example, software 705 may include program instructions for implementing a multipoint format process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support multipoint formats in cells in an optimized manner. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   a spreadsheet application comprising program instructions stored on the one or more computer readable storage media that, when executed by the one or more processors, direct the computing apparatus to at least:
   identify a format of a first cell and a second cell in a spreadsheet hosted by the spreadsheet application, wherein the format comprises multiple data points;
   receive user input from a user via a user interface to the spreadsheet application, wherein the user input comprises a selection of an option to share, via a relay service remote with respect to the computing apparatus, an instance of the first cell and an instance of the second cell with a second application of a type that differs from the spreadsheet application, wherein the second application resides on a second computing apparatus associated with a second user;

receive, from the relay service, multiple values corresponding to the multiple data points of the first cell input by the second user via a user interface to the second application and returned by the second application via the relay service to the spreadsheet application;

store each value of the multiple values in text of the first cell as a separately referenceable value with respect to each other value of the multiple values;

display at least a portion of the text of the first cell such that at least one value of the multiple values is visible in a user interface of the computing apparatus;

receive a state change to at least one of multiple data points of the second cell input by the user via the user interface to the spreadsheet application; and send the state change to the at least one of the multiple data points of the second cell, via the relay service, to the second application.

2. The computing apparatus of claim 1 wherein the spreadsheet comprises a group of cells that include the first cell and wherein the program instructions further direct the computing apparatus to at least display the group of cells in the user interface and, in response to a selection of the first cell, display an input module in the user interface through which to enter the multiple values into the first cell.

3. The computing apparatus of claim 2 wherein the input module comprises multiple input elements corresponding to the multiple data points of the first cell, wherein each one of the multiple input elements is configured to receive an individual one of the multiple values.

4. The computing apparatus of claim 1 wherein the program instructions further direct the computing apparatus to at least:

determine that a formula defined in a different cell includes a reference to a data point of the multiple data points in the first cell;

obtain a one value of the multiple values in the first cell that corresponds to the data point referenced by the formula; and calculate a result of the formula based at least on the one value.

5. The computing apparatus of claim 1 wherein the program instructions further direct the computing apparatus to at least:

determine that a formula defined in a sub-procedure associated with the spreadsheet includes a reference to a data point of the multiple data points in the first cell;

obtain a one value of the multiple values in the first cell that corresponds to the data point referenced by the formula; and calculate a result of the formula based at least on the one value.

6. The computing apparatus of claim 1 wherein the format comprises a custom schema defined in accordance with a standard notation, and wherein the program instructions further direct the computing apparatus to receive user input comprising the custom schema.

7. The computing apparatus of claim 6 wherein the standard notation comprises JavaScript Object Notation (JSON), and wherein the custom schema identifies a name for each of the multiple data points and a type for each of the multiple data points.

8. A method of operating a computing device comprising:

on the computing device, identifying a format of a first cell and a second cell in a spreadsheet hosted by a spreadsheet application, wherein the format comprises multiple data points;

on the computing device, receiving user input from a user via a user interface to the spreadsheet application, wherein the user input comprises a selection of an option to share, via a relay service remote with respect to the computing device, an instance of the first cell and an instance of the second cell with a second application of a type that differs from the spreadsheet application, wherein the second application resides on a second computing apparatus associated with a second user;

on the computing device, receiving, from the relay service, multiple values corresponding to the multiple data points of the first cell input by the second user via a second user interface to the second application and returned by the second application via the relay service to the spreadsheet application;

on the computing device, storing each value of the multiple values in text of the first cell as a separately referenceable value with respect to each other value of the multiple values;

display at least a portion of the text of the first cell such that at least one value of the multiple values is visible in the user interface of the computing device;

on the computing device, receiving a state change to at least one of the multiple data points of the second cell input by the user via the user interface to the spreadsheet application; and on the computing device, sending the state change to the at least one of the multiple data points of the second cell, via the relay service, to the second application.

9. The method of claim 8 wherein the spreadsheet comprises
a group of cells that include the first cell and wherein the method further comprises: displaying the group of cells in the user interface; and in response to a selection of the first cell, displaying an input module in the user interface through which to enter the multiple values into the first cell.

10. The method of claim 9 wherein the input module comprises multiple input elements corresponding to the multiple data points of the first cell, wherein each one of the multiple input elements is configured to receive an individual one of the multiple values.

11. The method of claim 8 wherein the method further comprises:

determining that a formula defined in a different cell includes a reference to a data point of the multiple data points in the first cell;

obtaining a one value of the multiple values in the first cell that corresponds to the data point referenced by the formula; and calculating a result of the formula based at least on the one value.

12. The method of claim 11 wherein the method further comprises:

determining that a formula defined in a sub-procedure associated with the spreadsheet includes a reference to a data point of the multiple data points in the first cell;

obtaining a one value of the multiple values in the first cell that corresponds to the data point referenced by the formula; and calculating a result of the formula based at least on the one value.

13. The method of claim 8 wherein the format comprises a custom schema defined in accordance with a standard notation, and wherein the method further comprises receiving user input comprising the custom schema.

14. The method of claim 13 wherein the standard notation comprises JavaScript Object Notation (JSON), and wherein the custom schema identifies a name for each of the multiple data points and a type for each of the multiple data points.

15. One or more computer readable storage media having a spreadsheet application comprising program instructions stored thereon that, when executed by one or more processors, direct a computing apparatus to at least:
- identify a format of a first cell and a second cell in a spreadsheet hosted by the spreadsheet application, wherein the format comprises multiple data points;
- receive user input from a user via a user interface to the spreadsheet application, wherein the user input comprises a selection of an option to share, via a relay service remote with respect to the computing apparatus, an instance of the first cell and an instance of the second cell with a second application of a type that differs from the spreadsheet application, wherein the second application resides on a second computing apparatus associated with a second user;
- receive, from the relay service, multiple values corresponding to the multiple data points of the first cell input by the second user via a user interface to the second application and returned by the second application via the relay service to the spreadsheet application;
- store each value of the multiple values in text of the first cell as a separately referenceable value with respect to each other value of the multiple values;
- display at least a portion of the text of the first cell such that at least one value of the multiple values is visible in a user interface of the computing apparatus;
- receive a state change to at least one of multiple data points of the second cell input by the user via the user interface to the spreadsheet application; and
- send the state change to the at least one of the multiple data points of the second cell, via, the relay service, to the second application.

16. The one or more computer readable storage media of claim 15 wherein the spreadsheet comprises a group of cells that include the first cell and wherein the program instructions further direct the computing apparatus to at least display the group of cells in the user interface and, in response to a selection of the first cell, display an input module in the user interface through which to enter the multiple values into the first cell.

17. The one or more computer readable storage media of claim 16 wherein the input module comprises multiple input elements corresponding to the multiple data points of the first cell, wherein each one of the multiple input elements is configured to receive an individual one of the multiple values.

18. The one or more computer readable storage media of claim 15 wherein the program instructions further direct the computing apparatus to at least:
- determine that a formula defined in one of a different cell or a sub-routine includes a reference to a data point of the multiple data points in the first cell;
- obtain a one value of the multiple values in the first cell that corresponds to the data point referenced by the formula; and
- calculate a result of the formula based at least on the one value.

19. The one or more computer readable storage media of claim 15 wherein the format comprises a custom schema defined in accordance with a standard notation, and wherein the program instructions further direct the computing apparatus to receive user input comprising the custom schema.

20. The one or more computer readable storage media of claim 19 wherein the standard notation comprises JavaScript Object Notation (JSON), and wherein the custom schema identifies a name for each of the multiple data points and a type for each of the multiple data points.

* * * * *